(12) United States Patent
Clarke

(10) Patent No.: US 7,305,976 B1
(45) Date of Patent: Dec. 11, 2007

(54) ENGINE HEATER AND METHOD

(75) Inventor: Matthew J. Clarke, Grayslake, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/435,483

(22) Filed: May 17, 2006

(51) Int. Cl.
*F02M 25/07* (2006.01)
*F02B 47/08* (2006.01)
*F02B 33/44* (2006.01)

(52) U.S. Cl. .............................. 123/568.12; 123/568.2; 60/605.2

(58) Field of Classification Search ................. 123/550, 123/551, 568.11, 568.12, 568.2; 60/278, 60/279, 605.2; 165/103, 175, 176
See application file for complete search history.

(56) References Cited

U.S. PATENT DOCUMENTS

| | | | | |
|---|---|---|---|---|
| 6,003,315 A | * | 12/1999 | Bailey ........................ | 60/605.2 |
| 6,138,649 A | * | 10/2000 | Khair et al. ............ | 123/568.12 |
| 7,032,577 B2 | * | 4/2006 | Rosin et al. ............ | 123/568.12 |
| 7,168,419 B2 | * | 1/2007 | Rosin et al. ............ | 123/568.12 |
| 7,195,006 B2 | * | 3/2007 | Khair et al. ............ | 123/568.12 |

FOREIGN PATENT DOCUMENTS

JP        2001323844 A    * 11/2001    ................. 123/551

* cited by examiner

*Primary Examiner*—Willis R. Wolfe, Jr.
(74) *Attorney, Agent, or Firm*—Jeffrey P. Calfa; Gerald W. Askew

(57) ABSTRACT

An apparatus includes an exhaust gas recirculation (EGR) cooler (111) fluidly communicating with an intake system (117) and an exhaust system (109) of an engine (100). An EGR valve (113) is in fluid communication with the EGR cooler (111). A turbocharger turbine (103) has an inlet in fluid communication with the exhaust system (109) and an outlet in fluid communication with a vehicle exhaust system (177). A bypass valve (115) is in fluid communication with the EGR cooler (111) and the outlet of the turbine (103). A cooling system (200) includes a heater supply passage (222) and a heater return passage (224). A vehicle heater (220) is in fluid communication with the cooling system (200), wherein a flow path of coolant is defined between the EGR cooler (111), the heater supply passage (222), the heater (220), the heater return passage (224), and the engine (100).

15 Claims, 2 Drawing Sheets

ENGINE HEATER AND METHOD

FIELD OF THE INVENTION

This invention relates to internal combustion engines, including but not limited to engines having engine warm-up devices.

BACKGROUND OF THE INVENTION

Many engines may exhibit poor performance when first started at cold ambient conditions until a desired operating temperature is reached. A typical measure to improve a performance of an engine, especially a diesel engine, during cold start conditions may be to advance ignition timing thus raising firing pressures of the engine. However, these high firing pressures may strain various engine components, including head gaskets and power generation components, such as pistons, connecting rods, crankshafts, intake, and/or exhaust valves. Moreover, a typical vehicle operator must sometimes wait for the engine to warm up before heat is available in the vehicle cab.

Other measures that have been taken in the past to improve quality of operation for engines that are starting in cold conditions have included raising the exhaust back pressure to make the engine work harder during warm-up and the addition of engine components, for example, fuel-fired or electrical heaters or secondary heater units for a vehicle cab. Such measures may be partly effective in accomplishing a faster warm-up for an engine or cab, but are usually very costly and complicated in their implementation.

Accordingly, there is a need for an engine heating system that accomplishes a short engine warm-up period and that is simple and cost effective in its implementation.

An apparatus and method are disclosed to aid in engine warm-up following engine startup at cold conditions. An apparatus is disclosed that includes an exhaust gas recirculation (EGR) cooler fluidly communicating with an intake system and an exhaust system of an engine. An EGR valve is in fluid communication with the exhaust side of the EGR cooler. A turbocharger turbine has an inlet disposed in fluid communication with the exhaust system and an outlet in fluid communication with a vehicle exhaust system. A bypass valve is in fluid communication with the exhaust side of the EGR cooler and the outlet of the turbine. A cooling system may be partially integrated with the internal combustion engine, and include a heater supply passage and a heater return passage. A cabin heater is in fluid communication with the cooling system, wherein a flow path of coolant is defined between the coolant side of the EGR cooler, the heater supply passage, the heater, the heater return passage, and the engine.

A method is disclosed for reducing a time required to warm-up an engine includes the step of determining whether cold conditions exist when the engine is first started. At times when the engine is first started under cold conditions, an operational state of the engine is determined. When the engine is in an idling mode, a bypass valve is opened that allows exhaust gas to pass through an exhaust gas recirculation (EGR) cooler but not the intake system of the engine so as to heat a flow of coolant passing through the EGR cooler. The flow of coolant from the EGR cooler is routed to a cabin heater of a vehicle.

A method of operating a turbocharged internal combustion engine is disclosed that includes the step of determining that the engine requires warming by comparing an engine operating parameter to a predetermined value. A flow of exhaust gas may be rerouted around a turbocharger turbine and through a first heat exchanger. The first heat exchanger may be used to warm a flow of coolant passing therethrough. The flow of coolant from the first heat exchanger may then be routed into a second heat exchanger disposed in a cabin of a vehicle.

DESCRIPTION OF A PREFERRED EMBODIMENT

Figure 1:
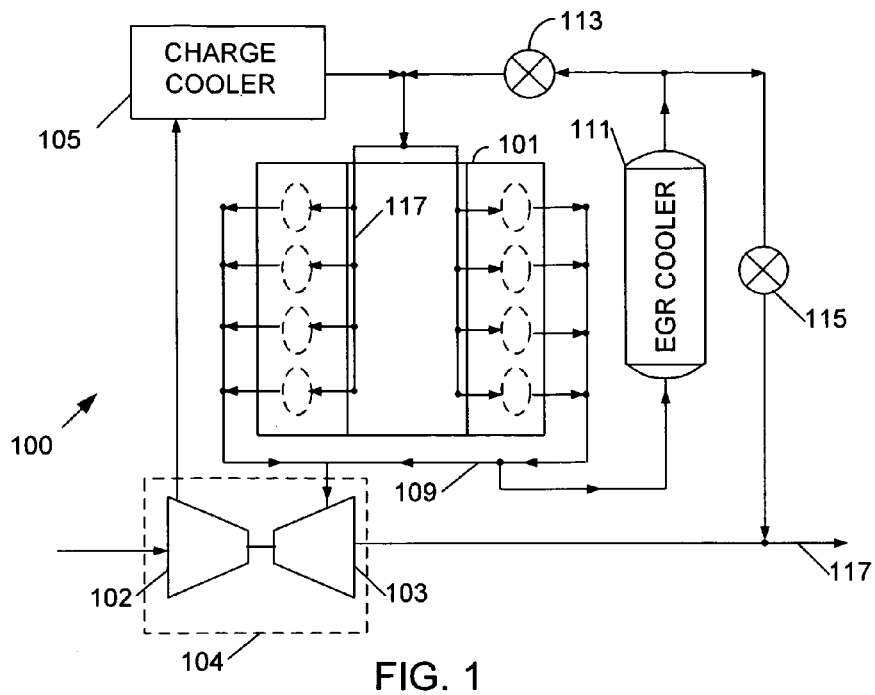
FIG. 1 is a block diagram of an internal combustion engine having a high-pressure EGR system with a bypass valve in accordance with the invention.

The following describes an apparatus for and method of providing a heater system in an internal combustion engine. A turbocharged engine 100 having a system to bypass exhaust gas around the turbocharger and through a heat exchanger is shown in FIG. 1. The engine 100 includes an engine block 101 having a plurality of cylinders. A compressor 102 is connected to an air cleaner (not shown) and a turbine 103 of turbocharger 104. An outlet of the compressor 102 is connected to a charge air cooler 105, which in turn is connected to an intake system 117. The turbine 103 is connected to an exhaust system 109. The exhaust system 109 is connected to the engine block 101, and may be connected to an EGR cooler 111. The EGR cooler 111 may be connected to an EGR valve 113 and to a dump or bypass valve 115. The EGR valve 113 and the bypass valve 115 may be actuated by electrical, pneumatic, mechanical, hydraulic, or any other type of actuation mode known in the art. The bypass valve 115 is in fluid communication with an outlet of the EGR cooler 111 on one end, and an outlet of the turbine 103 on another end. The outlet of the turbine 103 and the bypass valve 115 may both fluidly communicate with a tailpipe or vehicle exhaust passage 117.

Even though one EGR cooler 111 is shown connected with the bypass valve 115, additional EGR coolers may be utilized in a serial or parallel arrangement that may use additional bypass valves. The bypass valve 115 is shown in fluid communication with the EGR valve 113, but may not be directly connected to the EGR valve 113 if the EGR valve 113 is not in fluid communication with the outlet of a single EGR cooler 111, but is instead disposed at another location, for example, at the outlet of a first EGR cooler in the presence of at least a second EGR cooler (not shown). In such a case, the bypass valve 115 could be disposed at the outlet of the second EGR cooler.

During engine operation, exhaust gas from the exhaust system 109 enters the EGR cooler 111 where it is cooled, and then enters the EGR valve 113. When the EGR valve 113 is open, the bypass valve 115 is advantageously closed so as to prevent leakage of exhaust gas around the turbine 103. In the case where the engine 100 also has emission after-treatment components, such as a particulate filter or a catalyst (not shown) in fluid communication with the outlet of the turbine 103, the bypass valve 115 may be at least partially opened to facilitate an increase of temperature, flow rate, pressure, or change transient conditions in the exhaust gas at the outlet of the turbine 103.

On certain occasions or events during engine operation, especially at times when the engine 100 first begins to operate under cold ambient conditions, the bypass valve 115 may open while the EGR valve 113 is advantageously closed, to bypass exhaust gas from the exhaust system 109 into the outlet of the turbine 103. Exhaust gas being bypassed may advantageously be cooled by passing through the EGR cooler 111. Heat removed from the exhaust gas passing through the bypass valve 115 and the EGR cooler 111 may advantageously be passed to a coolant flow passing through the EGR cooler 111.

Figure 2:
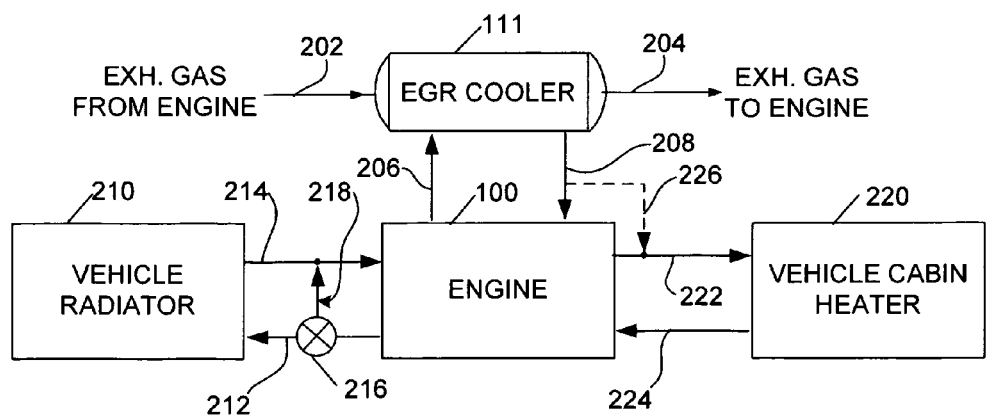
FIG. 2 is a block diagram of a cooling system for an internal combustion engine in accordance with the invention.

The EGR cooler 111 may be connected to a cooling system of the engine 100. A block diagram of a heating system 200 associated with the engine 100 is shown in FIG. 2. The heating or cooling system 200 may include a coolant pump (not shown) along with various coolant passages integrated with the engine 100, or external to the engine 100. The EGR cooler 111 may have an exhaust gas supply passage 202 and an exhaust gas return passage 204 as described above. A coolant supply passage 206 may supply the EGR cooler 111 with a flow of coolant from the engine 100, while a coolant return passage 208 may return the flow of coolant from the EGR cooler 111 back into the engine 100. The passages 206 and 208 may or may not be integrated in whole or in part with other engine components on the engine 100, and may be part of the heating or cooling system 200. A radiator 210 may be located on a vehicle (not shown) and be in fluid communication with the cooling system 200 through a radiator supply passage 212 and a radiator return passage 214. A thermostat 216 may be arranged to interrupt a coolant flow between the engine 100 and the radiator 210 through the supply passage 212. A bypass passage 218 may be connected between the supply passage 212 and the return passage 214 at the thermostat 216.

The engine 100 may be installed into a vehicle (not shown) and be arranged to provide power for operation of the vehicle. An ancillary function of the engine may be to provide heat to a cabin of the vehicle as is known. A vehicle cabin heater 220 may be disposed in the cabin of the vehicle. The heater 220 may be an air-to-water heat exchanger that may transfer thermal energy from coolant coming from the engine 100 to the air inside the cabin of the vehicle.

The heater 220 may receive a flow of coolant from the engine 100 through a heater supply passage 222. The flow of coolant may return to the engine 100 through a heater return passage 224. During operation of the engine 100, a vehicle operator may take appropriate action to enable use of the heater 220. While the heater 220 is operating, a flow of warm coolant from the engine 100 may enter the heater 220 through the passage 222 where heat may be extracted therefrom and released into the cabin of the vehicle for warming the passengers during cold conditions. After heat has been extracted from the flow of coolant passing through the heater 220, the coolant may be returned to the engine 100 through the passage 224.

It may be advantageous to the operation of the heater 220 to have warm coolant being supplied thereto through the passage 222. Warm coolant supplied to the heater 220 may increase an effectiveness of the heater 220. The effectiveness and the total heat the heater 220 is capable of transferring into the cabin of the vehicle may become especially important under conditions of initial startup during cold ambient conditions. A typical engine, especially a compression ignition engine, may take 15 minutes or more after initial startup to reach a satisfactorily high operating temperature that is capable of providing adequate heat to the heater 200 for heating the cabin of the vehicle. For this and other reasons, the EGR cooler return passage 208 may advantageously be in direct fluid communication with the heater supply passage 222 through an optional connecting passage 226.

During operation of the engine 100 shortly following initial startup, exhaust gas may be used to heat a flow of coolant passing through the EGR cooler 111. This flow of coolant may then pass through the vehicle cabin heater 220 either directly through the optional passage 226, or through a normal flow path through the engine 100 defined by the passage 222.

Figure 3:
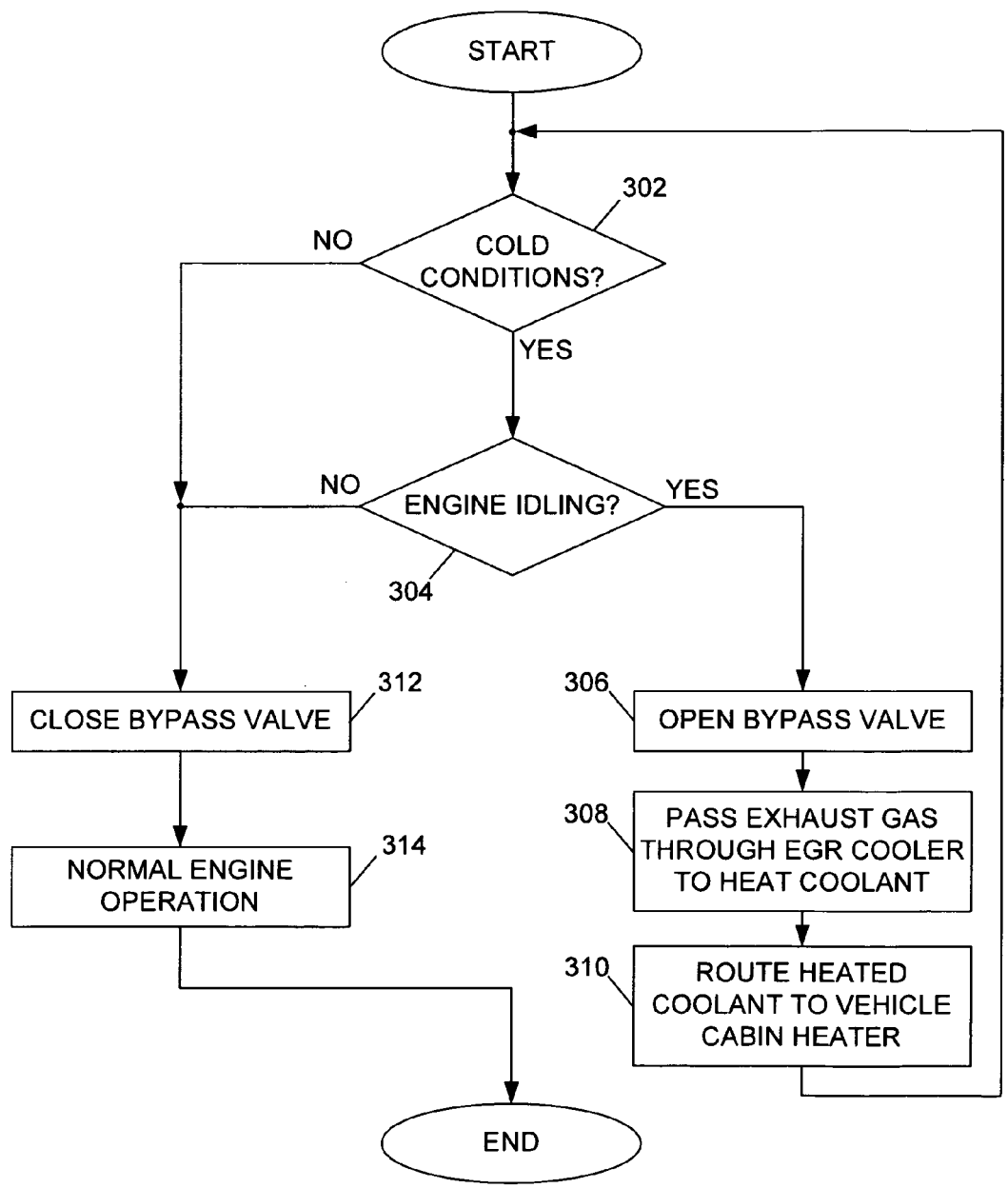
FIG. 3 is a flowchart for a method of operating an internal combustion engine in accordance with the invention.

A method of operating an internal combustion engine for accelerated warm-up during cold start conditions, as compared to warm-up for a typical engine, is shown in FIG. 3. When the engine begins operation, a determination is made on whether cold conditions are present at step 302. This determination may be made based on input(s) from various sensors disposed on or around the engine that may be relayed to an electronic engine controller (EEC). The EEC may calculate a thermal condition of the engine by comparing one or more engine parameters to predetermined threshold values. These engine parameters may advantageously include coolant temperature, oil temperature, exhaust temperature, intake air temperature, ambient temperature, and so forth. At times when it is determined that the engine is operating in cold conditions, a determination may be made as to the operational status of the engine.

A determination of whether the engine is idling may be made at step 304. This determination may again be made in the engine's EEC and be based on engine operating parameters including engine speed, fueling commanded, engine timing, and so forth. In a typical application, a fuel or ignition timing for the engine may be adjusted to increase a cylinder combustion pressure. This increase typically increases an internal work of the engine, which may result in a faster warm-up of the engine, but also may create issues with various engine components as a result of increased combustion pressures. For example, high combustion pressures during engine warm-up have been known to cause failures in head gaskets, piston rings, and other components. Use of a bypass valve for routing exhaust gas during engine warm-up through an EGR cooler before releasing them to a tailpipe, especially at times when EGR for recirculation is not required, may be used to avoid many of the known disadvantages associated with engine warm-up.

Hence, at times when it has been determined that the engines is cold (at step 302) and idling (at step 304), a bypass valve may open at step 306 to allow exhaust gas that previously would have been released to the tailpipe of a vehicle, to pass through the EGR cooler, at step 308, and warm a coolant flow passing therethrough before passing back to the tailpipe. On engines having a turbocharger that are idling, the quantity of exhaust gas required by the turbine is low. Consequently, most of the exhaust gas being passed through the EGR cooler at step 308 can advantageously bypass the turbocharger to ensure that the exhaust gas being re-routed to the EGR cooler has a higher enthalpy, and thus more thermal energy to transfer to the flow of coolant passing through the EGR cooler, thereby providing a faster warm-up.

The flow of coolant passing through the EGR cooler that has been warmed by the exhaust gas being re-routed may be routed to the vehicle cabin heater at step 310. While passing through the cabin heater, the flow of coolant may release some of its thermal energy to heat the cabin of the vehicle before returning to the engine. This process may be repeated as long as the engine still requires warming or, while the engine is still idling and there is no power output required.

Should the engine becomes sufficiently warm, or should the driver demand power from the engine to move the vehicle, then the output at determination steps 302 and 304 will become negative and the bypass valve will close at step 312, for normal operation of the engine to resume at step 314.

This method of reducing the time required for an engine to reach normal operating temperature during a cold start condition is advantageous over the prior art because it does not require the engine to operate with higher cylinder compression pressures. Moreover, use of existing engine components, for example the EGR cooler, enables a cost effective implementation. The bypass valve added to the system that fluidly connects a gas outlet of the EGR cooler with an outlet of a turbine, if one is used, may advantageously also be used during normal operation of the engine to purge the EGR cooler.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus for warming an internal combustion engine comprising:
    an exhaust gas recirculation (EGR) cooler fluidly communicating with an intake system and an exhaust system;
    an EGR valve in fluid communication with the EGR cooler;
    a turbocharger turbine having an inlet disposed in fluid communication with the exhaust system and an outlet in fluid communication with a vehicle exhaust system;
    a bypass valve in fluid communication with the EGR cooler and the outlet of the turbine;
    a cooling system integrally disposed with the internal combustion engine and having a heater supply passage and a heater return passage;
    a heater in fluid communication with the cooling system, wherein a flow path of coolant is defined between the EGR cooler, the heater supply passage, the heater, the heater return passage, and the engine.

2. The apparatus of claim 1, wherein the cooling system further includes an EGR cooler supply passage and an EGR cooler return passage, wherein the EGR cooler supply passage and the EGR cooler return passage fluidly connect a coolant side of the EGR cooler with the cooling system of the engine.

3. The apparatus of claim 2, wherein the flow path of coolant further includes the EGR cooler supply passage and the EGR cooler return passage.

4. The apparatus of claim 2, further comprising a connecting passage that is part of the flow path of coolant, wherein the connecting passage fluidly connects the EGR cooler return passage directly to the heater supply passage.

5. A method for reducing a time required to warm-up an engine, comprising the steps of:
    determining whether cold conditions exist when the engine is first started;
    when the engine is first started under cold conditions, determining an operational state of the engine;
    when the engine is in an idling mode, opening a bypass valve;
    passing exhaust gas through an exhaust gas recirculation (EGR) cooler to heat a flow of coolant passing through the EGR cooler, wherein the exhaust gas passing through the EGR cooler does not enter an intake system of the engine;
    routing the flow of coolant from the EGR cooler to a cabin heater of a vehicle.

6. The method of claim 5, wherein the step of determining whether cold conditions exist includes determining at least one engine operating parameter selected from: coolant temperature, oil temperature, intake air temperature, exhaust temperature, and ambient temperature; and
    comparing the at least one engine operating parameter to a predetermined value.

7. The method of claim 5, further comprising the step of closing the bypass valve when it is determined that the engine has reached a sufficiently warm operating temperature.

8. The method of claim 5, further comprising the step of closing the bypass valve when it is determined that the engine is no longer in the idling mode.

9. The method of claim 5, further comprising the step of resuming normal engine operation when the engine has reached a sufficiently warm operating temperature.

10. The method of claim 5, further comprising the step of resuming normal engine operation when the engine is no longer in the idling mode.

11. A method of operating a turbocharged internal combustion engine, comprising the steps of:
    determining that the engine requires warming by comparing an engine operating parameter to a predetermined value;
    actuating a valve to divert a flow of exhaust gas through a first heat exchanger without passing through a turbine of an engine turbocharger;
    using the first heat exchanger to warm a flow of coolant passing therethrough;
    routing the flow of coolant from the first heat exchanger into a second heat exchanger disposed in a cabin of a vehicle, wherein the step of rerouting is accomplished by opening a bypass valve.

12. The method of claim 11, further comprising the step of closing the bypass valve when the engine is warm.

13. A method of operating a turbocharged internal combustion engine, comprising the steps of:
    determining that the engine requires warming by comparing an engine operating parameter to a predetermined value;
    actuating a valve to divert a flow of exhaust gas through a first heat exchanger without passing through a turbine of an engine turbocharger;
    using the first heat exchanger to warm a flow of coolant passing therethrough;
    routing the flow of coolant from the first heat exchanger into a second heat exchanger disposed in a cabin of a vehicle, wherein the first heat exchanger is an EGR cooler having a coolant outlet that is directly connected to a coolant inlet of the second heat exchanger.

14. The method of claim 13, wherein the step of determining is accomplished in an electronic engine controller, wherein the electronic engine controlled is arranged and constructed to receive at least one input from a sensor disposed on the engine.

15. The method of claim 14, wherein the at least one input is at least one of a coolant temperature, an oil temperature, an intake air temperature, and exhaust temperature, and an ambient temperature.

* * * * *